United States Patent [19]

Kubota et al.

[11] Patent Number: 4,559,265

[45] Date of Patent: Dec. 17, 1985

[54] MAGNETIC RECORDING MEDIUM

[75] Inventors: Yuichi Kubota; Masaharu Nishimatsu, both of Komoro; Shigeru Shimada, Saku, all of Japan

[73] Assignee: TDK Corporation, Tokyo, Japan

[21] Appl. No.: 567,953

[22] Filed: Jan. 4, 1984

[30] Foreign Application Priority Data

Jan. 6, 1983 [JP] Japan ..................................... 58-581

[51] Int. Cl.$^4$ ............................................. G11B 5/70
[52] U.S. Cl. ................................. 428/336; 252/62.54; 360/134; 360/135; 360/136; 427/44; 427/128; 427/131; 428/694; 428/900; 428/522
[58] Field of Search ............... 428/694, 695, 522, 336; 427/44, 130, 128, 131; 252/62.54; 360/134–136

[56] References Cited

U.S. PATENT DOCUMENTS

| | | | |
|---|---|---|---|
| 4,368,239 | 1/1983 | Nakajima | 428/695 |
| 4,434,210 | 2/1984 | Nakajima | 428/694 |
| 4,448,846 | 5/1984 | Chang | 428/412 |

Primary Examiner—Ellis P. Robinson
Attorney, Agent, or Firm—Wyatt, Gerber, Shoup, Scobey and Badie

[57] ABSTRACT

A magnetic recording medium, produced by preparing a resin solution for magnetic paint having as a main component thereof a copolymer of (A) vinyl chloride, (B) a vinyl carboxylate, (C) an unsaturated carboxylic acid and (D) an unsaturated carboxylic anhydride, containing 50 to 80% by weight of (A) based on the total of the amounts of (A) and (B), 60 to 90% by weight of (D) based on the total of the amounts of (C) and (D), and 1 to 5 parts by weight of the total of (C) and (D) based on 100 parts by weight of the total of (A) and (B) and having an average polymerization degree of 100 to 400, mixing 10 to 80% by weight of said resin solution weigh 90 to 20% by weight of a radiation-sensitive curing resin, blending the resultant mixture as a main component with a magnetic powder, applying the resultant magnetic paint to a non-magnetic substrate, and solidifying the applied layer of paint with radiation.

9 Claims, No Drawings

MAGNETIC RECORDING MEDIUM

BACKGROUND OF THE INVENTION

1. Field of the Invention

This invention relates to a magnetic recording medium. More particularly, this invention relates to a magnetic recording medium of outstanding surface property and high electromagnetic property produced by blending a vinyl chloride copolymer solution containing vinyl chloride, a vinyl carboxylate, an unsaturated carboxylic acid and a carboxylic anhydride with a radiation-sensitive curing resin and a magnetic powder, applying the resultant magnetic paint to a non-magnetic substrate, and solidifying the applied layer of paint with radiation.

2. Description of Prior Arts

Magnetic recording media are used extensively in the form of magnetic tapes for audio and video recording, magnetic disks for computers and word processors, and magnetic cards for other household appliances, for example. In the production of such magnetic recording media, the practice of effecting fast adhesion of magnetic powder formulations to their substrates by using a radiation-sensitive curing resin as a binder and crosslinking and polymerizing this binder with radiation is now in vogue.

The magnetic recording media using the aforementioned radiation-sensitive curing resin as the binder, however, have the disadvantage that they have high friction coefficients and are deficient in surface property such as gloss, orienting property and electromagnetic property. As a solution to these disadvantages, we formerly found a resin solution for magnetic paint having as a main component thereof a copolymer of (A) vinyl chloride, (B) a vinyl carboxylate, (C) an unsaturated carboxylic acid and (D) an unsaturated carboxylic anhydride, containing 50 to 80% by weight of (A) based on the total of the amounts of (A) and (B), 60 to 90% by weight of (D) based on the total of the amounts of (C) and (D), and 1 to 5 parts by weight of the total of (C) and (D) based on 100 parts by weight of the total of (A) and (B) and having a average polymerization degree of 100 to 400 (Japanese Patent Open No. SHO 57(1982)-128,711). Magnetic recording media prepared using the solution mentioned above, however, are still unsatisfactory in terms of friction coefficient, gloss, orienting property, electromagnetic property, etc.

An object of this invention, therefore, is to provide an improved magnetic recording medium.

Another object of this invention is to provide a magnetic recording medium which has a low friction coefficient and is excellent in surface property, orienting property and electro-magnetic property.

SUMMARY OF THE INVENTION

The objects described above are accomplished by a magnetic recording medium which is produced by preparing a resin solution for magnetic paint having as a main component thereof a copolymer of (A) vinyl chloride, (B) a vinyl carboxylate, (C) an unsaturated carboxylic acid and (D) an unsaturated carboxylic anhydride, containing 50 to 80% by weight of (A) based on the total the amounts of (A) and (B), 60 to 90% by weight of (D) based on the total of the amounts of (C) and (D), and 1 to 5 parts by weight of the total of (C) and (D) based on 100 parts by weight of the total of (A) and (B) and having an average polymerization degree of 100 to 400, mixing 10 to 80% by weight of the aforementioned resin solution with 90 to 20% by weight of a radiation-sensitive curing resin, blending the resultant mixture as a main component with a magnetic powder, applying the resultant magnetic paint to a non-magnetic substrate, and solidifying the applied layer of paint with radiation.

PREFERRED EMBODIMENT OF THE INVENTION

The resin solution for magnetic paint to be mixed with a radiation-sensitive curing resin in accordance with this invention is a solution of a copolymer resin of (A) vinyl chloride, (B) a vinyl carboxylate, (C) an unsaturated carboxylic acid and (D) an unsaturated carboxylic anhydride, having an average polymerization degree of 100 to 400.

To cite concrete examples of the monomers which are copolymerized with (A) vinyl chloride, those of (B) the vinyl carboxylate are vinyl acetate, vinyl propionate and Vinyl Versatate (proprietary name for Shell product), vinyl acetate being a preferred choice; those of (C) the unsaturated carboxylic acid are maleic acid, itaconic acid, fumaric acid, acrylic acid and methacrylic acid, maleic acid being a preferred choice; and those of (D) the unsaturated carboxylic anhydride are maleic anhydride and itaconic anhydride, maleic anhydride being a preferred choice.

In the aforementioned copolymer, (A) vinyl chloride is contained in an amount of 50 to 80% by weight, preferably 60 to 80% by weight, based on the total of the amounts of (A) vinyl chloride and (B) the vinyl carboxylate. If the amount of (A) vinyl chloride based on the aforementioned total exceeds 80% by weight, the solution obtained by mixing the copolymer with the magnetic powder acquires higher viscosity than is desirable so that the magnetic paint, prior to application to the substrate, must to have its viscosity lowered by the use of a large amount of solvent. If the amount of (A) vinyl chloride based on the aforementioned total is less than 50% by weight, the applied layer of paint has less strength than desirable, with the possible result that the layer will peel off or undergo blocking. Then, (D) the unsaturated carboxylic anhydride is contained in an amount of 60 to 90% by weight, preferably 70 to 90% by weight, based on the total of the amounts of (C) the unsaturated carboxylic acid and (D) the unsaturated carboxylic anhydride If the amount of (D) the unsaturated carboxylic anhydride based on the aforementioned total exceeds 90% by weight, the dispersibility of the magnetic powder in the copolymer resin solution is lower than is desirable. If the amount of (D) the unsaturated carboxylic anhydride based on the aforementioned total is less than 60% by weight, the reaction of the copolymer resin solution with the radiation-sensitive curing resin proceeds too fast to afford a magnetic paint of ample pot life. Further in the aforementioned copolymer, the total of the amounts (C) the unsaturated carboxylic acid and (D) the unsaturated carboxylic anhydride is in the range of 1 to 5 parts by weight, preferably 1 to 4 parts by weight, based on 100 parts by weight of the total (A) vinyl chloride and (B) the vinyl carboxylate. If the total is less than 1 part by weight, the reactivity of the copolymer resin solution with the radiation-sensitive curing resin is weaker than is desirable. If the total exceeds 5 parts by weight, the aforementioned reactivity with the radiation-sensitive curing resin is higher than is desirable so that the magnetic paint has too short pot life to suit actual use.

The average polymerization degree of the aforementioned vinyl chloride copolymer is limited to the range of 100 to 400. The reason for this range of average polymerization degree is that when the copolymer is converted into the magnetic paint and, in that form, applied to the substrate, the surface of the applied layer of paint is too weak to withstand actual use if the average polymerization degree of the copolymer is less than 100. The magnetic paint has such a high viscosity that it is difficult to apply if the average polymerization degree exceeds 400. The quality of the applied layer of paint and its condition are very good when the average polymerization degree is in the range of 200 to 400.

The vinyl chloride copolymer is dissolved in an organic solvent. Examples of the organic solvent used advantageously for this solution are esters such as ethyl acetate and butyl acetate, ketones such as acetone, methylethyl ketone and methylisobutyl ketone, and aromatic hydrocarbons such as xylene and toluene. These organic solvents may be used singly or in mixtures. The proportions of the vinyl chloride copolymer and the organic solvent in the solution are variable with the condition of use of the solution and, therefore, cannot be definitely specified. Generally, the vinyl chloride copolymer involved in the present invention can be used in its unaltered form for the preparation of the magnetic paint when it is produced by solution polymerization. If the amount of the organic solvent used in the solution is in the range of 30 to 70% by weight, solution polymerization can be smoothly effected. The copolymer may be diluted with the organic solvent when necessary. It is, advantageous to use the same solvent for preparation of the paint as for the solution polymerization.

The resin solution for magnetic paint is contained in an amount of 10 to 80% by weight, preferably 20 to 70% by weight based on 90 to 20% by weight, preferably 80 to 30% by weight of the radiation-sensitive curing resin.

The radiation-sensitive curing resin used in the present invention is a resin which contains at least one unsaturated double bond in the molecular chain and which generates radicals on exposure to radiation and is cured by being cross-linked or polymerized. Some high molecular substances partially degrade on exposure to radiation and the fragments undergo cross-linking. Examples of the latter type of high molecular substances are polyethylene, polypropylene, polystyrene, polyacrylic esters, polyacrylamide, polyvinyl chloride, polyesters, polyvinyl pyrrolidone rubber, polyvinyl alcohol and polyacrolein. Such a cross-linking type polymer can be used in its unaltered form in the preparation of the magnetic layer.

The radiation-sensitive curing resin used in this invention may be prepared by modifying a thermoplastic resin to impart radiation sensitivity. The resin so prepared proves more desirable from the standpoint of the spread of curing. The radiation-sensitizing modification can be effected, for example, by incorporating into a given molecule an acrylic double bond such as of acrylic acid, methyacrylic acid or esters thereof which possess a radially polymerizable unsaturated double bond, an allyl type double bond such as of diallyl phthalate, or an unsaturated bond such as of maleic acid or maleic acid derivatives, or other group which induces cross-linking or polymerization upon exposure to radiation. Any other unsaturated double bond compound which is cross-linked and polymerized by exposure to radiation may be similarly usable.

Concrete examples are as follows.

(1) VINYL CHLORIDE TYPE COPOLYMERS

Vinyl chloride-vinyl acetate-vinyl alcohol copolymer, vinyl chloride-vinyl alcohol copolymer, vinyl chloride-vinyl alcohol-vinyl propionate copolymer, vinyl chloride-vinyl acetate-maleic acid copolymer, and vinyl chloride-vinyl acetate-terminal OH side chain alkyl group copolymer. Commercially available vinyl chloride type copolymers are produced by Union Carbide Corp. and marketed under trademark designations VROH, VYNC, VYEGX and VERR, for example.

The copolymers enumerated above undergo the radiation-sensitizing modification when they are mixed with monomers having an acrylic double bond, a maleic acid double bond, or an allyl type double bond by a method to be described afterward.

(2) SATURATED POLYESTER RESINS

Saturated polyester resins to be obtained by the reaction of such saturated polybasic acids as phthalic anhydride, isophthalic acid, terephthalic acid, succinic acid, adipic acid and sebacic acid with such polyhydric alcohols as ethylene glycol, diethylene glycol, glycerol, trimethylol propane, 1,2-propylene glycol, dipropylene glycol, 1,3-butane diol, 1,4-butane diol, 1,6-hexane diol, pentaerythritol, sorbital, neopentyl glycol and 1,4-cyclohexane dimethanol. Resins obtained by modifying the saturated polyester resins mentioned above with for example $SO_3Na$, (Bylon 53S for example). They are caused to undergo the radiation-sensitizing modification by the same method.

(3) UNSATURATED POLYESTER RESINS

Polyester compounds having a radiation curable unsaturated double bond in the molecular chains thereof are suitable. Specifically, unsaturated polyester resins containing a radiation curing unsaturated double bond produced by substituting an unsaturated polybasic acid such as maleic acid or fumaric acid for part of the polybasic acid in the saturated polyester resins described in the preceding paragraph (2) and obtained by esterfication of polybasic acids with polyhydric alcohols, and prepolymers and oligomers are also examples.

The various compounds enumerated in the paragraph (2) can be cited as examples of the polybasic acids and polyhydric alcohols for the saturated polyester resins. Examples of the radiation curable unsaturated double bond compounds are maleic acid and fumaric acid.

Such a radiation setting unsaturated polyester resin can be obtained by combining at least one polybasic acid, at least one polyhydric alcohol, and maleic acid or fumaric acid, subjecting the resultant mixed system to a reaction for removal of water or alcohol by the known method, namely in the presence or absence of a catalyst at 180° to 200° C. under a blanket of nitrogen gas, and subjecting the resultant reaction mixture to condensation under a vacuum of 0.5 to 1 mmHg at an elevated temperature of 240° to 280° C. The content of maleic acid or fumaric acid is desired to be 1 to 40 mol %, preferably 10 to 30 mol %, based on the total acid content, in consideration of the cross-linking and the radiation curing to be effected during the course of production.

(4) POLYVINYL ALCOHOL TYPE RESINS

Polyvinyl alcohol, butyral resin, acetal resin, formal resin and copolymers thereof are useful. These resins also may have their hydroxyl group subjected to the radiation-sensitizing modification by the same method.

(5) EPOXY TYPE RESINS AND PHENOXY RESINS

Epoxy resins obtained by the reaction of bis-phenol A with epichlorohydrin or methyl epichlorohydrin (such as products of Shell Chemical marketed under trademark designations of Epikote 152, 154, 828, 1001, 1004, and 1007, products of Dow Chemical marketed under trademark designations of DEN 431, DER 732, DER 511 and DER 331, and products of Dainippon Ink And Chemicals, Inc. marketed under trademark designations of Epicron 400 and Epicron), phenoxy resins which are high polymer resins of the aforementioned epoxy (such as products of Union Carbide marketed under trademark designations of PKHA, PKHC and PKHH), and copolymers of brominated bis-phenol A with epichlorohydrin (such as products of Dainippon Ink And Chemicals, Inc. marketed under trademark designations of Epicron 145, 152, 153 and 1120). These resins also may be subjected to radiation-sensitizing modification by virtue of their epoxy group.

(6) CELLULOSE DERIVATIVES

Cellulose derivatives of varying molecular weights are also effectively used as thermoplastic components. Among other cellulose derivatives, nitrocellulose, cellulose acetobutyrate, ethyl cellulose, butyl cellulose and acetyl cellulose prove particularly desirable. They also may be subjected to radiation-sensitizing modification by virtue of their hydroxyl group by the same method.

(7) OTHERS

Polyfunctional polyester resins, polyether ester resins, polyvinyl pyrrolidone resins and derivatives thereof (such as vinyl pyrrolidone-ethylene copolymer), polyamide resin, polyimide resin, phenol resin, spiroacetal resin and hydroxyl group-containing acrylic and methacrylic resins are also usable for the purpose of the radiation-sensitizing modification.

Examples of other binder components usable in this invention are such monomers as acrylic acid, methacrylic acid, acrylamide and methacrylamide. Binders having a double bond may be obtained by modifying various polyesters, polyols and polyurethanes with a compound having an acrylic double bond. Optionally, they may be given varying molecular weights by incorporation of polyhydric alcohols and polycarboxylic acids.

The substances so far described are part of radiation-sensitive curing resins usable in the present invention.

Such a radiation-sensitive modified thermoplastic resin is enabled to give an applied layer of paint having further increased toughness by incorporating therein a thermoplastic elastomer or prepolymer.

This incorporation of the elastomer or prepolymer becomes more effective when the elastomer or prepolymer is similarly modified for radiation-sensitization.

Examples of the elastomer or prepolymer usable advantageously for the purpose of this invention are as follows.

(1) POLYURETHANE ELASTOMERS, PREPOLYMERS AND TELOMERS

Polyurethane elastomers are particularly effective in terms of wear resistance and adhesiveness to polyethylene terephthalate film.

Examples of such urethane compounds are polyurethane elastomers, prepolymers and telomers formed of polycondensates of various isocyanates such as 2,4-toluene diisocyanate, 2,6-toluene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4-4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexylmethane diisocyanate, Desmodur L and Desmodur N; linear saturated polyesters (such as polycondensates of polyhydric alcohols such as ethylene glycol, diethylene glycol, glycerol, trimethylol propane, 1,4-butane diol, 1,6-hexane diol, pentaerythritol, sorbitol, neopentyl glycol and 1,4-cyclohexane dimethanol with saturated polybasic acids such as phthalic anhydride, isophthalic acid, terephthalic acid, maleic acid, succinic acid and adipic acid); linear saturated polyethers (such as polyethylene glycol, polypropylene glycol and poly-tetramethylene glycol), and various polyesters such as caprolactam, hydroxyl-containing acrylates and hydroxyl-containing methacrylates.

Such as elastomer may be combined in its unaltered form with the aforementioned thermoplastic resin modified for radiation-sensitization. The elastomer may be used more effectively, however, when it is modified for radiation-sensitization by reaction with an acrylic compound having a double bond and capable of reacting with the isocyanate group or hydroxyl group at the terminal of the polyurethane elastomer or with a monomer having such an acrylic double bond.

(2) ACRYLONITRILE-BUTADIENE COPOLYMER ELASTOMERS

The acrylonitrile-butadiene copolymer prepolymer having a terminal hydroxyl group produced by Sinclar Petrochemical Corp. and marketed under trademark designateion of Poly-BD Liquid Resin and the elastomers produced by Nippon Geon Co., Ltd. and marketed under trademark designations of Hiker 1432J, etc. are particularly suitable as elastomer components because the double bonds in their butadiene moieties are capable of generating radicals and inducing cross-linking and polymerization upon exposure to radiation.

(3) POLYBUTADIENE ELASTOMERS

The prepolymers having a low molecular terminal hydroxyl group produced by Sinclare Petrochemical Corp. and marketed under trademark designations of Poly-BD-Liquid Resin R-15, etc. are highly suitable in terms of compatibility with thermoplastic resins. In the prepolymer, R-15, since a hydroxyl group forms the terminal of the molecule, this prepolymer can be made to acquire improved sensitivity to radiation by addition of an acrylic unsaturated double bond to the molecular terminal. The prepolymer thus modified proves more advantageous as a binder.

Further, the cyclized polybutadiene (produced by Japan Synthetic Rubber Co., Ltd. and marketed under trademark designation of CBR-M 901) manifests an outstanding behavior when properly combined with a thermoplastic resin. Particularly, the cyclized polybutadiene has a strong capacity for inducing cross-linking and polymerization with unsaturated bond radicals upon exposure to radiation, a property inherent in polybutadiene. Thus, it enjoys an outstanding quality as a binder.

In the class of other thermoplastic elastomers and their prepolymers, preferred members are elastomers such as styrene-butadiene rubber, chlorinated rubber, acrylic rubber, isobutylene rubber and cyclization product thereof (such as the product of Japan Synthetic Rubber Co., Ltd. marketed under trademark designation of CIR 701), epoxy-modified rubber, and internally plasticized saturated linear polyester (such as the product of Toyo Spinning Co., Ltd. marrketed under trademark designation of Byron #300). They may be effectively utilized when they are treated for radiation-sentizing modification.

When a solvent is used in the preparation of the resin solution for the magnetic paint according to the present invention, it can be selected from the group consisting of ketones such as acetone, methylethyl ketone, methylisobutyl ketone and cyclohexanone, alcohols such as methanol, ethanol, isopropanol and butanol which have been protected from reacting with any isocyanate type thermosetting binder, ethers such as tetrahydrofuran and dioxane, solvents such as dimethyl formamide, polyvinyl pyrrolidone and nitropropane, and aromatic hydrocarbon diluent or solvents such as toluene and xylene.

The substrate to which the magnetic paint is applied may be a polyethylene terephthalate type film which is currently utilized widely in magnetic recording media. When the finished magnetic recording medium is intended for an application demanding heat resistance, the substrate may be a polyimide film or polyamideimide film. If a thin polyester type film is adopted as a substrate normally it is subjected to either monoaxial orientation or biaxial orientation in advance.

The magnetic powder for use in this invention may be selected from among a rich variety of finely divided magnetic powders such as $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, $CrO_2$, Co type compound-absorbed $\gamma$-$Fe_2O_3$, Co type compound-absorbed $Fe_3O_4$ (inclusive of the inter-mediate oxide with $\gamma$-$Fe_3O_4$; the term "Co type compound" as used herein means cobalt oxide, cobalt hydroxide, cobalt ferrite, or cobalt ion adsorbate which is capable of effectively utilizing the magnetic anisotropy of cobalt for improvement of coercive force), and combinations formed preponderantly of such ferromagnetic metal element as Co, Fe-Co, Fe-Co-Ni and Co-Ni. The preparation of the magnetic powder can be effected by the wet reduction method using a reducing agent such as $NaBH_4$ or the method which comprises the steps of treating the surface of iron oxide with a Si compound and then subjecting the treated iron oxide to dry reduction such as with hydrogen gas or to vacuum evaporation under a current of low-pressure argon gas. Finely divided singlecrystal barium ferrite can be also used.

The finely divided magnetic powder may be formed of needle-shaped particles or granular particles. The choice between these two forms is made according to the nature of the use to which the finished magnetic recording medium is put. The needle-shaped particles of the powder are desired to have an average major axis of 0.1 to 1 $\mu$m and an average minor axis of 0.02 to 0.1 $\mu$m.

The granular particles of the powder are desired to have an average particle diameter of 0.01 to 0.5 $\mu$m. The finely divided magnetic powder is incorporated in an amount of 200 to 900% by weight, preferably 250 to 700% by weight, based on the total amount of the aforementioned resin.

The aforementioned resin composition and the magnetic powder are throughly kneaded and dispersed in a suitable device such as, for example, a ball mill, a sand grind mill, a roll mill, a high-speed impeller dispersion machine, a homogenizer or a supersonic-wave dispersion machine, to produce a magnetic paint. This magnetic paint is applied by an ordinary method to a nonmagnetic substrate. The thickness of the applied layer of the paint is 5 to 20 $\mu$m, preferably 0.5 to 10 $\mu$m, on dry basis.

As regards the radiation-sensitive curing type binder to be used for the manufacture of the magnetic recording medium of this invention, various antistatic agents, dispersant, and abradants normally adopted for uses of the nature contemplated herein may be suitably incorporated in addition to those additives specified by this invention for incorporation in the magnetic paint.

As the active energy ray to be used for causing crosslinking of the applied layer of magnetic paint in the present invention, adoption of the electron beam emanating from an electron beam accelerator proves advantageous for the reason given below. Optionally, however, the $\gamma$ ray originating in $Co^{60}$, the $\beta$ ray originating in $Sr^{90}$, or the X ray originating in an X-ray generator may be effectively used.

As the source for radiation, adoption of the aforementioned electron beam accelerator proved particularly advantageous in consideration of the ease with which the dosage of absorbed ray is controlled, the ionization radiation for the introduction into the production line is automatically shielded, and the connection between the various facilities in the production line and the sequence control unit is effected. To date, various electron beam accelerators have been developed, such as the Cockcroft type accelerator, the Van de Graaf type accelerator, the interchangeable transformer type accelerator, the iron core insulation transformer type accelerator and the linear accelerator. They vary one from another mainly in the manner for generating high voltage. Most magnetic recording media intended for general-purpose applications have small magnetic layer thicknesses not exceeding 10 microns. The high-speed voltage excedding 1000 kV normally used in the aforementioned accelerators find no use in the production of such magnetic recording media. Thus, acoption of an electron beam accelerator rated for a low accelerated voltage of 300 kV or less suffices for the irradiation contemplated in this invention. This accelerator of such a low accelerated voltage is further advantageous in respect of the cost required for the purchase of a shielding device against the ionizing radiation besides the cost of the system itself.

The advantage in terms of the cost of shielding device is indicated in Table 1.

TABLE 1

| Accelerated voltage and thickness of shield | | |
|---|---|---|
| Accelerated voltage (kV) | Shielding material | Shield thickness (cm) |
| 150 | Lead | 0.5 |
| 200 | Lead | 2 |
| 300 | Lead | 3 |

TABLE 1-continued

| Accelerated voltage and thickness of shield | | |
|---|---|---|
| Accelerated voltage (kV) | Shielding material | Shield thickness (cm) |
| 500 | Concrete | 85 |
| 750 | Concrete | 115 |
| 1,000 | Concrete | 125 |
| 2,000 | Concrete | 175 |
| 3,000 | Concrete | 190 |

[Source: Report of Radiation Utilization Study Meeting, page 8 (August, 1979 Japan Atomic Energy Forum)]

It is noted from Table 1 that in the electron beam accelerator of not more than 300 kV of accelerated voltage, use of lead plates (3 cm in maximum thickness) as a shield to enclose the entire accelerator tube encircling the site of irradiation will suffice for thorough interception of X-ray leak. Thus, there is no need for erecting an expensive electron ray irradiation chamber exclusively for shielding the leak and the system itself can be incorporated as one unit in the whole production line for magnetic recording media. Consequently, the drying and curing of magnetic tapes or magnetic sheets with an electron ray can be carried out in a continuous line.

Concrete examples of the system advantageously used in this invention include a low voltage type electron beam accelerator produced by Energy Science, Inc. (ESI) of the United States marketed under trademark designation of Electrocurtain System, an electron beam accelerator produced by RPC Corp. and marketed under trademark designation of Broad-beam System, and a self-shielding type scanning low voltage type electron accelerator produced by Polymer Physik of West Germany. Where the aforementioned applied layer of binder is cured by the use of a low voltage accelerator of 150 to 300 kV, if the dosage of absorbed ray exceeds 5 Mrads, the magnetic recording media for audio and memory applications suffer from aggravated deposition of peeled magnetic film on the recording heads and those for video applications suffer from similar aggravated deposition on the rotary cylinders, both to the extent of impairing the durability of media in the course of use under conditions of high temperature and high humidity. When the dosage of absorbed ray falls in the range of 0.5 to 5 Mrads, the polymerization and the cross-linking caused by the irradiation with the electron ray occur in densities proper for the applied layer of magnetic paint to acquire flexibility and rigidity in suitable balance, exhibit improved resistance to wear due to friction of the magnetic layer against the recording head, and preclude deposition of peeled magnetic film on the head or on the cylinder. Thus, the magnetic recording medium consequently obtained exhibits outstanding performance.

As concerns the cross-linking of the binder in the applied layer of magnetic paint, it is important that the layer of magnetic paint on the substrate should be exposed to the radiation under a current of an inert gas such as nitrogen gas or helium gas. As is often the case with any applied layer containing a magnetic pigment in an extremely high concentration, the applied layer of magnetic paint densely containing the magnetic powder inevitably assumes a highly porous texture. If this layer is exposed to the radiation in air, the radiation for inducing the cross-linking of the binder gives rise to ozone in the air and, as the result, the radicals generated in the polymer are impeded by this ozone from effectively fulfilling its function of causing the cross-linking reaction. The ozone has its adverse effect not simply on the surface of the applied layer of magnetic paint but equally on the deep interior of the applied layer because of the porosity of texture, impeding the progress of the cross-linking of the binder. Thus, it is important that the immediate atmosphere enclosing the site of irradiation with the active energy ray should be filled up with an inert gas such as nitrogen gas, helium gas or carbon dioxide gas having the highest tolerable oxygen concentration of 1%, preferably not more than 3,000 ppm.

Now, the present invention will be described more specifically below with reference to a working example.

Example:

An autoclave was charged with 130 parts by weight of vinyl chloride, 70 parts of weight of vinyl acetate, 105 parts by weight of methylethyl ketone, 45 parts by weight of toluene and 2 parts by weight of benzoyl peroxide, and it was heated at 55 C to induce polymerization of the monomers. When the conversion of vinyl chloride-vinyl acetate reached 10%, one sixth of a mixed solution containing 4.5 parts by weight of maleic anhydride, 1.5 parts by weight of maleic acid and 30 parts by weight of methylethyl ketone was added to the reaction system. The remaining five sixths of the mixed solution was added piecemeal over the period during which the aforementioned conversion rose from 10% to 60%. After the polymerization was continued until the conversion rose to 90%, the reaction system was cooled. The resin solution having a resin content of about 50% by weight consequently obtained in the autoclave was taken out. By analysis, this resin was found to be a copolymer containing 70 parts by weight of vinyl chloride, 30 parts by weight by vinyl acetate, 23 parts by weight of maleic anhydride and 0.7 part by weight of maleic acid and having a polymerization degree of 250. This copolymer solution will be called Solution A.

In a ball mill, the components described below were mixed for three hours to have the needle-shaped particles of magnetic iron oxide thoroughly wetted with the dispersant.

Cobalt-coated needle-shaped particles of $\gamma$-$Fe_2O_3$, (major axis 0.5 $\mu$m, minor axis 0.05 $\mu$m, Hc 600 Oe), 120 parts by weight.

Carbon black, (antistatic grade, Mitsubishi Carbon Black MA 600), 5 parts by weight.

Powdered $\alpha$-$Al_2O_3$, (average particle diameter 0.5 $\mu$m) 2 parts by weight.

Dispersant, (lecithin isolated from soybean oil), 3 parts by weight.

Solvent, (methylethyl ketone/toluene: 50/50), 100 parts by weight.

Then, the following components were thoroughly mixed and dissolved.

Solution A, (calculated as solids), (polymerization degree about 250), 6 parts by weight.

Butyral resin incorporating acrylic double bond, 9 parts by weight.

Polyether urethane elastomer incorporating acrylic double bond, (calculated as solids), 15 parts by weight.

Solvent, (methylethyl ketone/toluene: 50/50), 200 parts by weight.

Fatty acid ester, (butyl myristate), 2 parts by eight.

Fatty acid, (myristic acid), 1 part by weight.

The resultant solution was added to the ball mill used for the treatment of the magnetic powder and again was mixed and disposed for 42 hours.

The magnetic paint thus obtained was applied to the surface of a polyester film 15 μm in thickness, oriented over a permanent magnet (1,600 gausses), dried with an infrared ray lamp or hot air to expel the solvent, treated to smoothen the surface, and irradiated with an electron ray using an electron curtain type electron beam accelerator of ESI under the conditions of 150 kV of accelerated voltage, 10 mA of electrode current, and 5 Mrad of dosage under a blanket of nitrogen gas having a residual oxygen concentration of 500 ppm to effect polymerization desiccation and curing of the applied layer of magnetic paint.

The tape thus obtained was cut into strips of a width of ½ inch to produce video tapes. The video tapes thus obtained were tested for various properties. The results were as shown in Table 2.

The procedure described above was repeated, except that the mixing ratio of the radiation-sensitive curing resin and the Solution A was changed by way of making various test runs. The results of the test runs indicate that the proportions of 90% by weight of the radiation-sensitive curing resin and 10% by weight of the Solution A and those of 20% by weight of the radiation-sensitive curing resin and 80% by weight of the Solution A were respectively the upper and lower limits for the radiation-sensitive curing resin and that so far as the resin fell within these limits, the friction coefficients were small, the surface properties including gloss were excellent, and the orientation and electromagnetic properties were good. For comparison, the procedure was repeated, except that the incorporation of the Solution A was omitted. The results of this comparative test are also shown in Table 2.

TABLE 2

| Physical property | Comparative test | Example |
|---|---|---|
| Friction coefficient | 0.3 | 0.25 |
| Gloss (%) | 100 | 150 |
| Electromagnetic conversion property (dB) | 0 | +1.0 |

The friction coefficient ($\mu$) was determined by winding a given magnetic tape on a friction cylinder, running the tape, measuring the inlet tension $T_o$ and the outlet tension $T_i$ of the tape in motion, and applying the results of the measurement to the following Euler's formula.

$$\mu = (1/\theta) \cdot \ln(T_i/T_o)$$

(wherein $\theta$ stands for the angle of winding (rad.) and ln for the natural logarithm).

The gloss was determined by projecting a beam of light at 60° of incident angle upon the magnetic side of a given tape, measuring the reflected beam of light, and calculating the ratio of the volumes of incident light and reflected light. It was, therefore, reported by this ratio expressed in percent. The data of gloss shown in Table 2 are numerical values of the relative levels of rating of the samples, with the gloss of the sample of Example 1 taken as 2 (200%).

The data of electromagnetic conversion property are values (dB) measured with a VHS video deck at RF sensitively of 4 MHz and computed based on the property of the sample of the comparative test taken as 0 dB.

Separately, the same prodecure was repeated, except that the mixing ratio of the radiation-sensitive curing resin and the Solution B was varied by way of making various test runs. The results of the test runs indicate that proportions of 90% by weight of the radiation-sensitive curing resin and 10% by weight of the Solution A and those of 20% by weight of the radiation-sensitive curing resin and 80% by weight of the Solution B were respectively the upper and lower limits for the radiation-sensitive curing resin and that so far as the resin fell within these limits, the freiction coefficients were small, the surface properties including gloss were excellent, and the orientation and electromagnetic properties were good.

What is claimed is:

1. A magentic recording medium, produced by preparing a resin solution for magnetic paint having as a main component thereof a copolymer of (A) vinyl chloride, (B) a vinyl carboxylate, (C) an unsaturated carboxylic acid and (D) an unsaturated carboxylic anhydride, containing 50 to 80% by weight of (A) based on the total of the amounts of (A) and (B), 60 to 90% by weight of (D) based on the total of the amounts of (C) and (D), and 1 to 5 parts by weight of the total of (C) and (D) based on 100 parts by weight of the total of (A) and (B) and having an average polymerization degree of 100 to 400, mixing 10 to 80% by weight of said resin solution with 90 to 20% by weight of a radiation- sensitive curing resin, blending the resultant mixture as a main component with a magnetic powder, applying the resultant magnetic paint to a non-magnetic substrate, and solidifying the applied layer of paint with radiation.

2. A magnetic recording medium according to claim 1, wherein said magnetic powder is contained therein in an amount of 200 to 900% by weight based on the total amount of resin.

3. A magnetic recording medium according to claim 2, wherein said resin solution for magnetic paint is contained in an amount of 20 to 70% by weight based on 80 to 30% by weight of said radiation-sensitive curing resin.

4. A magnetic recording medium according to claim 1, wherein (A) said vinyl chloride is contained in an amount of 50 to 80% by weight based on the total of the amounts of (A) said vinyl chloride and (B) said vinyl carboxylate and (D) said unsaturated carboxylic anhydride is contained in an amount of 60 to 90% by weight based on the total of the amounts of (C) said unsaturated carboxylic acid and (D) said unsaturated carboxylic anhydride.

5. A magnetic recording medium according to claim 4, wherein the total of the amount of the amount of (C) said unsaturated carboxylic acid and (D) said unsaturated carboxylic anhydride is 1 to 5 parts by weight based on 100 parts by weight of the total of the amounts of (A) said vinyl chloride and (B) said vinyl carboxylate.

6. A magnetic recording medium according to claim 1, wherein (B) said vinyl carboxylate is at least one member selected from the group consisting of vinyl acetate, vinyl propionate and Vinyl Versatate, (C) said unsaturated carboxylic acid is at least one member selected from the group consisting of maleic acid, itaconic acid, fimaric acid, acrylic acid and methacrylic acid and (D) said unsaturated carboxylic anhydride is at least one member selected from the group consisting of maleic anhydride and itaconic anhydride.

7. A magnetic recording medium according to claim 6, wherein (B) said vinyl carboxylate is vinyl acetate, (C) said unsaturated carboxylic acid is maleic acid and (D) said unsaturated carboxylic anhydride is maleic anhydride.

8. A magnetic recording medium according to claim 1, wherein said applied layer of magnetic paint has a thickness of 0.5 to 20 μm on dry basis.

9. A magnetic recording medium according to claim 8, wherein said non-magnetic substrate is a polyethylene terephthalate film.

* * * * *